United States Patent [19]
Tahara et al.

[11] Patent Number: 5,585,879
[45] Date of Patent: Dec. 17, 1996

[54] PHOTOSENSITIVE MATERIAL PROCESSING APPARATUS

[75] Inventors: Toshiro Tahara; Yukio Sugita; Youichi Kimura; Kazuo Shiota; Haruyoshi Kuriyama, all of Kanagawa-ken, Japan

[73] Assignee: Fuji Photo Film Co., Ltd., Kanagawa-ken, Japan

[21] Appl. No.: 283,150

[22] Filed: Aug. 3, 1994

[30] Foreign Application Priority Data

Aug. 4, 1993 [JP] Japan .................................. 5-193609

[51] Int. Cl.$^6$ .................................................. G03D 13/00
[52] U.S. Cl. .............................. 396/570; 355/40; 396/567
[58] Field of Search ............................ 354/319–323, 354/339, 340, 298; 355/27–29, 40, 41; 250/559.01, 559.02; 242/526

[56] References Cited

U.S. PATENT DOCUMENTS

| 4,868,919 | 9/1989 | Tanaka et al. ............. 355/27 |
| 5,083,154 | 1/1992 | Terashita et al. .......... 355/68 |
| 5,087,928 | 2/1992 | Okino ....................... 346/108 |
| 5,175,570 | 12/1992 | Haneda et al. ............ 355/327 X |
| 5,307,114 | 4/1994 | Nitsch et al. .............. 355/29 |
| 5,319,408 | 6/1994 | Shiota ....................... 354/298 |

FOREIGN PATENT DOCUMENTS

| 0187427 | 7/1986 | European Pat. Off. . |
| 434058A3 | 12/1990 | European Pat. Off. . |
| 0434058 | 6/1991 | European Pat. Off. . |
| 0494105 | 7/1992 | European Pat. Off. . |
| 55-000568 | 1/1980 | Japan . |
| 55-115035 | 9/1980 | Japan . |

OTHER PUBLICATIONS

Research Disclosure; Feb. 1989; No. 298.
Patent Abstracts Of Japan, vol. 4, #168 (P–037), Nov. 20, 1980 & & JP–A–55 115 035, Sep. 4, 1980.
Patent Abstracts Of Japan, vol. 4, #27 (P–001) Mar. 7, 1980 & JP–A–55 000 568 (Canon) Jan. 5, 1980.
Research Disclosure, No. 298, Feb. 1989, New York pp. 107–113, "Photographic Processing Apparatus", Ceuppens, p. 107, 11. 30–34.

*Primary Examiner*—D. Rutledge

[57] ABSTRACT

In a photosensitive material processing apparatus, a photosensitive material taking on the form of a long strip is fed into a conveyance mechanism and conveyed in this form along a predetermined conveyance path. An exposure device, a reservoir section, a development processing section, and a cutter are located in the conveyance path. The exposure device carries out scanning exposing operations on the long strip of the photosensitive material and thereby forms latent images on the long strip of the photosensitive material. In the reservoir section, a looped portion for serving as a buffer for conveyance is formed in the long strip of the photosensitive material, on which the latent images have been formed. In the development processing section, development processing is carried out on the long strip of the photosensitive material, which is fed via the reservoir section. The cutter cuts the long strip of the photosensitive material, which has been subjected to the development processing, into sheets having a predetermined length.

37 Claims, 10 Drawing Sheets

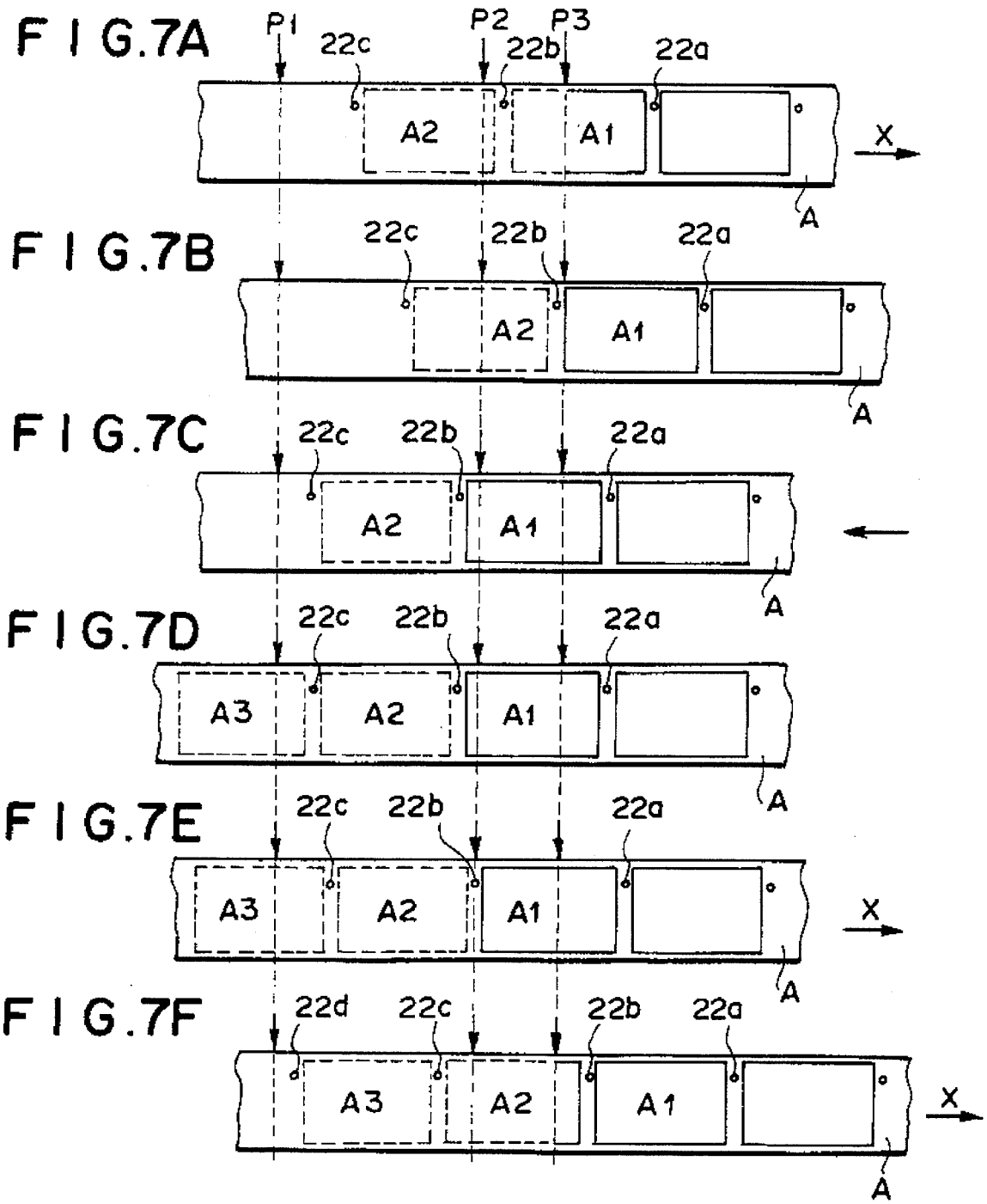

PHOTOSENSITIVE MATERIAL PROCESSING APPARATUS

BACKGROUND OF THE INVENTION

1. Field of the Invention

This invention relates to a photosensitive material processing apparatus, wherein a photosensitive material is scanned with and exposed to light, latent images are thereby formed on the photosensitive material, the photosensitive material is then subjected to development processing, and positive images are thereby formed on the photosensitive material. This invention also relates to a photosensitive material exposing apparatus for use in the photosensitive material processing apparatus.

2. Description of the Prior Art

Miniature development laboratories and photosensitive material processing apparatuses, which are referred to as photoprinters, are provided with an exposing section, in which a photosensitive material is exposed to light and a latent image is thereby formed on the photosensitive material, a development processing section, in which development, fixing, and washing are carried out, a drying section, and the like. The operation for exposing the photosensitive material to light is carried out by irradiating light, which has passed through a negative film, to the photosensitive material. The exposing operations are classified into a surface exposing operation and a scanning exposing operation, which is carried out via a slit.

The exposing operation and the development processing are carried out by conveying the photosensitive material from the exposing section to the development processing section. Such operations are classified into a system, wherein the photosensitive material is formed into a plurality of sheets before being exposed to light and the sheets are conveyed one after another at predetermined intervals, and a system, wherein a roll of photosensitive material is subjected to the exposing operation and the development processing and is finally cut and finished to predetermined lengths by using a cutter.

In the past, a photosensitive material was subjected to an analog exposing operation, in which the photosensitive material was exposed to light having passed through a negative film. Recently, it has been proposed to carry out a digital scanning exposing operation, in which a laser beam is modulated in accordance with image information having been obtained by reading out an image recorded on a negative film, and a photosensitive material is scanned with and exposed to the modulated laser beam. However, in order for the digital scanning exposing operation to be carried out, the accuracy, with which the adjustment of the position of the photosensitive material, conveyance of the photosensitive material, or the like, is carried out, must be kept high. It has been revealed that, if conventional position adjusting mechanisms and guide mechanisms are utilized directly for the digital scanning exposing operation, advantages of the digital scanning exposing operation cannot be achieved sufficiently. Specifically, the digital scanning exposing operation requires more accurate control techniques and mechanisms than in the analog exposing operation and thus has various problems to be solved.

As for the conveyance of the photosensitive material, the photosensitive material has heretofore been formed into a plurality of sheets, the sheets of the photosensitive material are then exposed to light and conveyed to the development processing step one after another. Therefore, when the sheets of the photosensitive material are conveyed one after another, a predetermined spacing must be set between adjacent sheets of the photosensitive material. For example, in cases where 100 mm-long sheets of the photosensitive material are conveyed one after another, a spacing of approximately 30 mm should be set between adjacent sheets. Also, in order for a series of processes, such as the exposing operation and the development processing, to be carried out quickly, the speed, with which the sheets of the photosensitive material are conveyed, must be kept high. For this purpose, the size of the entire photosensitive material processing apparatus cannot be kept small. Further, since the sheets of the photosensitive material are continuously conveyed at the predetermined intervals, the reliability, with which the sheets are conveyed, cannot be kept high.

As a means for solving the problems described above, it may be considered to utilize a long strip of photosensitive material, instead of the photosensitive material being formed into a plurality of sheets. In cases where the long strip of the photosensitive material is conveyed, the spacing between frames, in which latent images are formed, can be reduced to approximately 3 mm. Therefore, in such cases, if the conveyance speed is kept the same, the processing capacity can be enhanced by approximately 30% as compared with the aforesaid technique utilizing the sheets of the photosensitive material.

However, in cases where the long strip of the photosensitive material is conveyed to the exposing section, disturbance, such as vibration of the conveyance mechanism, will be transferred to the photosensitive material, and the photosensitive material will meander or will move unintentionally. Therefore, the scanning exposing operation cannot be carried out accurately. Specifically, such that the long strip of the photosensitive material may be conveyed to the exposing section and the scanning exposing operation can be carried out accurately, a measure for preventing the disturbance must be taken for the conveyance mechanism.

Also, the photosensitive material is provided with a mark for identification of the image information recorded on the photosensitive material, and the exposing operation is carried out in accordance with the mark. However, in cases where the photosensitive material takes on the form of a long strip and, for example, hole marks are formed with a punching device in the long strip of the photosensitive material, the vibration due to the punching operation is transferred to the photosensitive material and adversely affects the scanning exposing operation. Further, in order for the exposing operation to be carried out in accordance with the mark formed on the photosensitive material, the mark must be formed in accordance with the image information before the exposing operation is carried out.

Moreover, after the exposing operation is carried out in accordance with a single unit of image information, a certain length of time is required to feed the next unit of image information into the photosensitive material processing apparatus when the exposing operation is to be carried out in accordance with the next unit of image information. However, if the conveyance of the photosensitive material is continued when the next unit of image information is being fed into the photosensitive material processing apparatus, a portion of the photosensitive material will remain unexposed to light. Therefore, the photosensitive material cannot be utilized efficiently.

Such that stable development processing may be carried out in the development processing section, the operation of the development processing section should preferably be continued when the image information is being fed into the photosensitive material processing apparatus. Therefore, it is necessary to provide a conveyance mechanism such that the photosensitive material can be utilized efficiently and such that the development processing can be continued when the image information is being fed into the photosensitive material processing apparatus.

The photosensitive material processing apparatus comprises a large number of members, each of which has a natural resonance frequency. Therefore, in particular, members of the exposing section should have different natural resonance frequencies such that the scanning exposing operation can be carried out under little vibration.

SUMMARY OF THE INVENTION

The primary object of the present invention is to provide a photosensitive material processing apparatus, wherein a long strip of photosensitive material is conveyed, subjected to a scanning exposing operation and development processing, and thereafter cut into sheets, and the processing capacity is thereby kept markedly large.

Another object of the present invention is to provide a photosensitive material exposing apparatus, wherein a long strip of photosensitive material is conveyed and subjected to a scanning exposing operation, and an exposure means is provided which carries out the scanning exposing operation without being adversely affected by disturbance occurring due to the conveyance of the long strip of the photosensitive material.

A further object of the present invention is to provide a photosensitive material exposing apparatus, wherein a long strip of photosensitive material is conveyed and subjected to a scanning exposing operation, and a conveyance mechanism is provided which is capable of preventing disturbance from occurring due to the conveyance of the long strip of the photosensitive material.

A still further object of the present invention is to provide a photosensitive material exposing apparatus, wherein a long strip of photosensitive material is conveyed and subjected to a scanning exposing operation, the photosensitive material is utilized efficiently, and development processing is carried out accurately.

The present invention provides a photosensitive material processing apparatus comprising a conveyance means, which conveys a photosensitive material along a predetermined conveyance path, an exposure means, which exposes the photosensitive material to light in accordance with image information and forms latent images on the photosensitive material, and a development processing section for developing the latent images, wherein the photosensitive material taking on the form of a long strip is fed into the conveyance means and conveyed in this form, and the exposure means, which carries out scanning exposing operations on the long strip of the photosensitive material and thereby forms latent images on the long strip of the photosensitive material, a reservoir section for forming a looped portion in the long strip of the photosensitive material, on which the latent images have been formed, the looped portion serving as a buffer for conveyance, the development processing section for carrying out development processing on the long strip of the photosensitive material, which is fed via the reservoir section, and a cutter for cutting the long strip of the photosensitive material, which has been subjected to the development processing, to a predetermined length are located in the conveyance path.

The present invention also provides a first photosensitive material exposing apparatus comprising a conveyance means, which conveys a photosensitive material along a predetermined conveyance path, and an exposure means, which exposes the photosensitive material to light in accordance with image information and forms latent images on the photosensitive material, wherein the photosensitive material taking on the form of a long strip is fed into the conveyance means and conveyed in this form, and the exposure means, which carries out scanning exposing operations on the long strip of the photosensitive material and thereby forms latent images on the long strip of the photosensitive material, and a loop forming means for forming looped portions in the long strip of the photosensitive material, which are located respectively on the side upstream from the exposure means and on the side downstream from the exposure means, the looped portions serving as buffers for conveyance, are located in the conveyance path.

The present invention further provides a second photosensitive material exposing apparatus comprising a conveyance means, which conveys a photosensitive material along a predetermined conveyance path, and an exposure means, which exposes the photosensitive material to light in accordance with image information and forms latent images on the photosensitive material, wherein the photosensitive material taking on the form of a long strip is fed into the conveyance means and conveyed in this form, and a mark forming means for forming a mark, which corresponds to image information, in the long strip of the photosensitive material, a sensor for detecting the presence or absence of a mark, and the exposure means, which carries out a scanning exposing operation on the long strip of the photosensitive material in accordance with detection of a mark by the sensor and thereby forms a latent image on the long strip of the photosensitive material, are located in the conveyance path.

The present invention still further provides a third photosensitive material exposing apparatus comprising a conveyance means, which conveys a photosensitive material along a predetermined conveyance path, and an exposure means, which exposes the photosensitive material to light in accordance with image information and forms latent images on the photosensitive material, wherein the photosensitive material taking on the form of a long strip is fed into the conveyance means and conveyed in this form, and a mark forming means for forming a mark, which corresponds to image information, in the long strip of the photosensitive material, the mark forming means waiting for an operation at a minimum specification length position for the formation of a latent image during the formation of marks, a sensor for detecting the presence or absence of a mark, and the exposure means, which carries out a scanning exposing operation on the long strip of the photosensitive material in accordance with detection of a mark by the sensor and thereby forms a latent image on the long strip of the photosensitive material, are located in the conveyance path.

The present invention also provides a fourth photosensitive material exposing apparatus comprising a conveyance means, which conveys a photosensitive material along a predetermined conveyance path, and an exposure means, which exposes the photosensitive material to light in accordance with image information and forms latent images on the photosensitive material, wherein the photosensitive material taking on the form of a long strip is fed into the conveyance means and conveyed in this form, and the exposure means, which carries out scanning exposing operations on the long strip of the photosensitive material in accordance with units of image information and thereby forms latent images on the long strip of the photosensitive material, and the conveyance means which, in cases where a next unit of image information to be used after a latent image is formed by the exposure means has not yet been determined, temporarily ceases the conveyance of the long strip of the photosensitive material after the formation of the latent image, reversely conveys the long strip of the photosensitive material by a predetermined amount, and thereafter waits for entry of the next unit of image information are located in the conveyance path.

The present invention further provides a fifth photosensitive material exposing apparatus comprising a conveyance means, which conveys a photosensitive material along a predetermined conveyance path, and an exposure means, which exposes the photosensitive material to light in accordance with image information and forms latent images on the photosensitive material, wherein the photosensitive material taking on the form of a long strip is fed into the conveyance means and conveyed in this form, the exposure means, which carries out scanning exposing operations on the long strip of the photosensitive material in accordance with units of image information and thereby forms latent images on the long strip of the photosensitive material, and a detection means, which detects the amount of meandering of the long strip of the photosensitive material being conveyed, are located in the conveyance path, and a timing signal generating means controls the position, at which the exposure along each scanning line by the exposure means is started, in association with the meandering of the long strip of the photosensitive material and in accordance with a detection signal, which is generated by the detection means.

The present invention still further provides a sixth photosensitive material exposing apparatus comprising a conveyance means, which conveys a photosensitive material along a predetermined conveyance path, an exposure means, which exposes the photosensitive material to light in accordance with image information and forms latent images on the photosensitive material, and a development processing section for developing the latent images, wherein the photosensitive material taking on the form of a long strip is fed into the conveyance means and conveyed in this form, and the exposure means, which comprises a rotatable body for conveying the long strip of the photosensitive material such that the long strip of the photosensitive material may be in close contact with the rotatable body, a motor for directly driving the rotatable body, and a scanning exposing unit for carrying out scanning exposing operations on the long strip of the photosensitive material, is located in the conveyance path.

With the photosensitive material processing apparatus in accordance with the present invention, the photosensitive material taking on the form of a long strip is conveyed in this form. Also, the exposure means, which carries out the scanning exposing operations, the reservoir section for forming a looped portion in the long strip of the photosensitive material, which is being conveyed, such that the looped portion may serve as a buffer for conveyance, the development processing section having the drying function, and the cutter are located in the conveyance path. Therefore, the scanning exposing operation can be carried out while the long strip of the photosensitive material is being conveyed. Also, after the development processing has been carried out on the long strip of the photosensitive material, the long strip of the photosensitive material is cut into sheets having a predetermined size. Accordingly, the processing capacity can be kept markedly large by virtue of the conveyance of the long strip of the photosensitive material. Further, the reservoir section is located such that, even if the conveyance of the long strip of the photosensitive material is ceased in the exposure means, the looped portion of the long strip of the photosensitive material can be conveyed into the development processing section. Therefore, the development processing need not be ceased and can thus be carried out reliably.

With the first photosensitive material exposing apparatus in accordance with the present invention, the photosensitive material taking on the form of a long strip is conveyed in this form. Also, looped portions are formed in the long strip of the photosensitive material. The looped portions are located respectively on the side upstream from the exposure means, which is located in the conveyance path, and on the side downstream from the exposure means. Therefore, even if disturbance, such as temporary stop, occurs with the photosensitive material, which is being conveyed, adverse effects of the disturbance do not occur on the portion of the photosensitive material, which is being scanned with and exposed to light. Accordingly, the scanning exposing operation can be carried out accurately.

With the second photosensitive material exposing apparatus in accordance with the present invention, the photosensitive material taking on the form of a long strip is conveyed in this form. The mark forming means for forming a mark, which corresponds to image information, in the long strip of the photosensitive material, is located in the conveyance path. Also, the sensor for detecting the presence or absence of a mark, and the exposure means, which carries out a scanning exposing operation on the long strip of the photosensitive material in accordance with the detection of a mark by the sensor and thereby forms a latent image on the long strip of the photosensitive material, are located in the conveyance path. Therefore, even if the photosensitive material takes on the form of the long strip, a mark can be formed at a required position in accordance with the image information. Also, the scanning exposing operation, the operation for cutting the photosensitive material, the back printing operation for each frame (i.e. the operation for printing an identification number, or the like, on the back surface of the photosensitive material), the control of the conveyance required for the detection of the presence or absence of the next unit of image information and for the entry of the image information, and the like, can be carried out in accordance with the detection of the formed mark. Adverse effects of disturbance due to the formation of the mark can be eliminated by the structure of the first photosensitive material exposing apparatus described above.

With the third photosensitive material exposing apparatus in accordance with the present invention, the photosensitive material taking on the form of a long strip is conveyed in this form. Also, the mark forming means is located in the conveyance path. The mark forming means forms a mark, which corresponds to image information, in the long strip of the photosensitive material, and waits for an operation at a minimum specification length position for the formation of a latent image during the formation of marks. Therefore, the storage capacity of a storage means, which stores image information before a latent image is formed, can be kept small.

With the fourth photosensitive material exposing apparatus in accordance with the present invention, the photosensitive material taking on the form of a long strip is conveyed in this form. Also, in cases where a next unit of image information to be used after a latent image is formed by the exposure means has not yet been determined, the conveyance means temporarily ceases the conveyance of the long strip of the photosensitive material after the formation of the latent image, reversely conveys the long strip of the photosensitive material by a predetermined amount, and thereafter waits for entry of the next unit of image information. For example, after the scanning exposing operation has been carried out in accordance with a single unit of image information, the conveyance of the photosensitive material is ceased for the entry of the next unit of image information, and the photosensitive material is then conveyed reversely. The scanning exposing operation is then begun after an approach running portion, which overlaps upon the already exposed portion, has passed through the position for exposure. Therefore, the scanning exposing operation in accordance with the next unit of image information can be carried out such that no blank space may be left after the portion which was exposed to light in accordance with the single unit of image information. During the period of the approach running, all of the driving systems reach their appropriate speeds, and the photosensitive material can thus be conveyed at the appropriate speed.

When the conveyance of the photosensitive material is ceased, the development processing can be continued by virtue of the aforesaid structure of the photosensitive material processing apparatus in accordance with the present invention.

With the fifth photosensitive material exposing apparatus in accordance with the present invention, the photosensitive material taking on the form of a long strip is conveyed in this form. Also, the amount of meandering of the long strip of the photosensitive material, which is being conveyed, is detected by the detection means. The position, at which the exposure along each scanning line by the exposure means is started, is controlled in association with the meandering of the long strip of the photosensitive material and in accordance with the detection signal, which is generated by the detection means. Therefore, the position, at which the exposure along each scanning line by the exposure means is started, can be prevented from shifting, and the scanning exposing operation can be carried out accurately without any distortion.

With the sixth photosensitive material exposing apparatus in accordance with the present invention, the photosensitive material taking on the form of a long strip is conveyed in this form. Also, the rotatable body, which conveys the long strip of the photosensitive material such that the long strip of the photosensitive material may be in close contact with the rotatable body, is directly driven by the motor. Further, the portion of the photosensitive material, which is in close contact with the rotatable body, is scanned with and exposed to light. Therefore, disturbance, such as unintentional movement of the rotatable body, and disturbance from other mechanisms as in belt driving system can be reduced. Also, the motor is selected from those having a number of poles free of adverse effects of resonance.

BRIEF DESCRIPTION OF THE DRAWINGS

FIGS. 7A through 7F are explanatory views showing how intermittent exposure of a photosensitive material to light is carried out in the second embodiment of the photosensitive material processing apparatus in accordance with the present invention.

DESCRIPTION OF THE PREFERRED EMBODIMENTS

The present invention will hereinbelow be described in further detail with reference to the accompanying drawings.

A first embodiment of the photosensitive material processing apparatus in accordance with the present invention will be described hereinbelow with reference to FIGS. 1 through 5.

Figure 1:
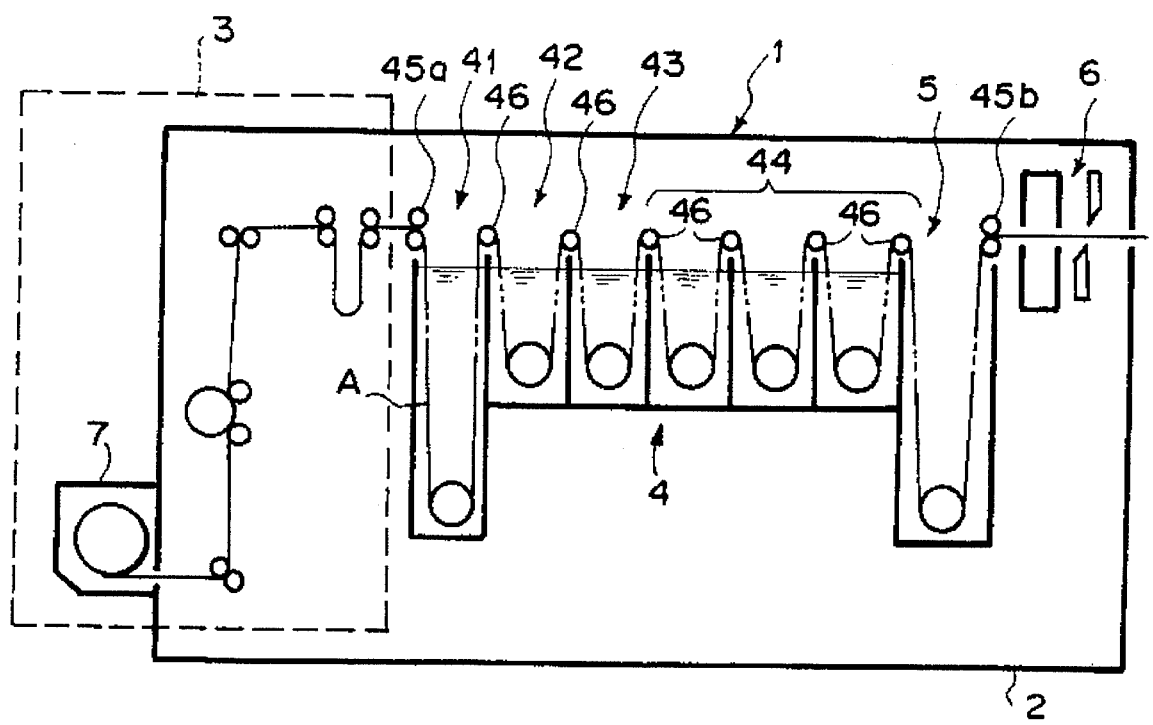
FIG. 1 is a schematic view showing a first embodiment of the photosensitive material processing apparatus in accordance with the present invention.
Figure 2:
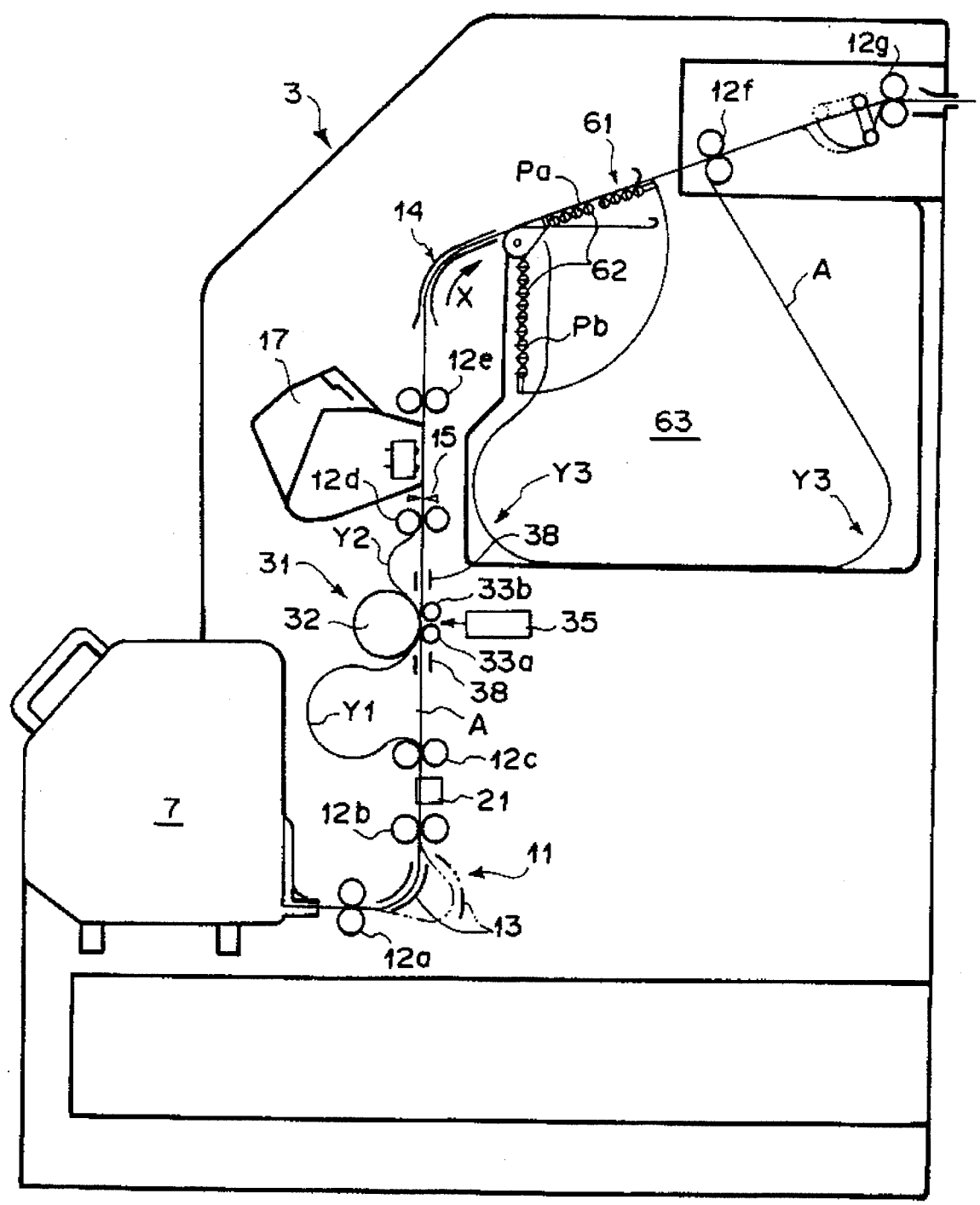
FIG. 2 is a schematic view showing an exposure processing section in the first embodiment of the photosensitive material processing apparatus in accordance with the present invention.

As illustrated in FIG. 1, a photosensitive material processing apparatus (hereinafter simply referred to as the processing apparatus) 1 comprises a case housing 2. An exposure processing section 3 for carrying out exposure processing, or the like, on a photosensitive material A, a development processing section 4, a drying section 5, and a cutter 6 are located in the case housing 2. The photosensitive material A takes on the form of a long strip and is fed in this form from a magazine 7 into the processing apparatus 1. As illustrated in FIG. 2, the exposure processing section 3 comprises a conveyance mechanism 11 for conveying the photosensitive material A, a hole punching device 21, and an exposing section 31, in which the photosensitive material A is scanned with and exposed to a laser beam and latent images are thereby formed on the photosensitive material A. The exposure processing section 3 also comprises a back printer 17, which prints a frame number, or the like, on the back surface of the photosensitive material A, and a reservoir section 61.

The conveyance mechanism 11 comprises pairs of nip rollers 12a, 12b, 12c, 12d, 12e, 12f, 12g, and guide members 13 and 14. The pairs of nip rollers 12a through 12g can be controlled such that they may be rotated or stopped. Stop of rotation of the pairs of nip rollers 12a through 12g will be described later together with the operation for conveying the photosensitive material A.

The hole punching device 21 forms a hole mark, which indicates the position for the start of the scanning exposing operation, in the photosensitive material A in accordance with image information, or the like. The mark is not limited to a hole and may be formed with an ink jet printer, a dot printer, or the like.

Figure 3:
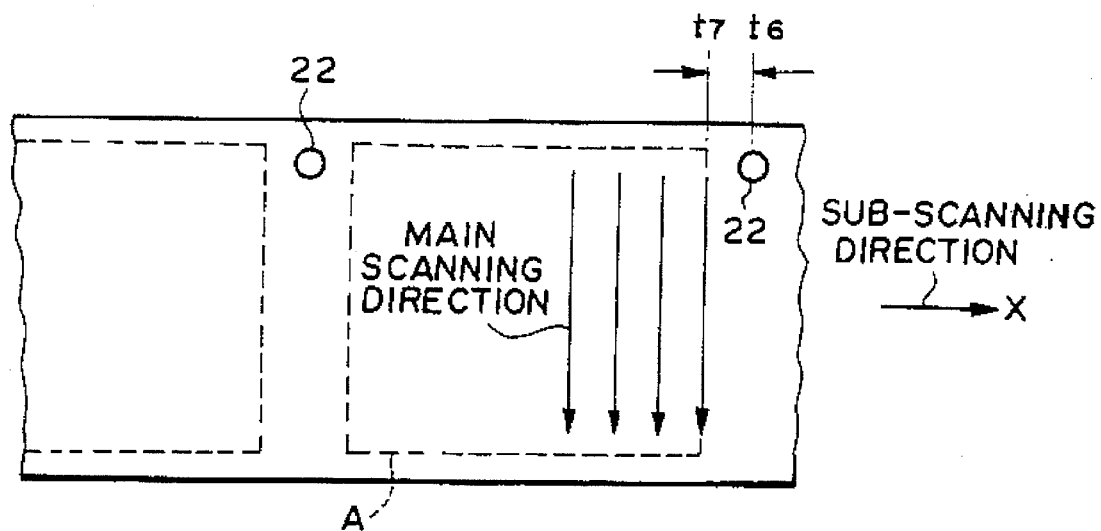
FIG. 3 is a plan view showing how a photosensitive material is exposed to light.

In the exposing section 31, the photosensitive material A is scanned with and exposed to a laser beam, and a latent image is thereby formed on the photosensitive material A. The image information, with which the laser beam is modulated, is fed from a memory circuit, which will be described later. As illustrated in FIG. 3, the scanning exposing operation is carried out along the width direction of the photosensitive material A (i.e., in the main scanning direction), and the photosensitive material A is conveyed along the sub-scanning direction. The exposure of the photosensitive material A to the laser beam is carried out without the conveyance of the photosensitive material A being ceased. The laser beam has a beam diameter of approximately 60 μm. Therefore, even if the latent image is formed on the photosensitive material A while the photosensitive material A is being conveyed, no visual problem will occur.

Figure 4:
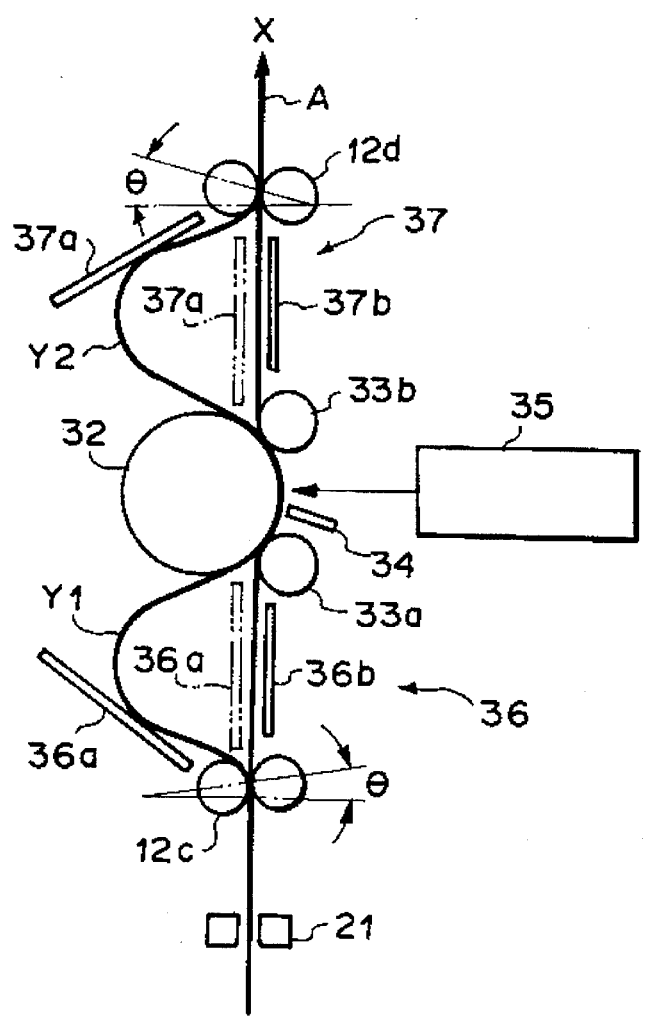
FIG. 4 is a schematic view showing an exposure section in the first embodiment of the photosensitive material processing apparatus in accordance with the present invention.

As illustrated in FIGS. 2 and 4, the exposing section 31 comprises a large-diameter drum 32, around which the photosensitive material A passes, and rollers 33a and 33b, which bring the photosensitive material A into close contact with the drum 32 and conveys the photosensitive material A. The exposing section 31 also comprises a sensor 34 and a scanning exposing unit 35. Guide members 36 and 37 for assisting the formation of loops of the photosensitive material A are respectively located on the side upstream from the drum 32 with respect to the direction of conveyance of the photosensitive material A (i.e. with respect to the sub-scanning direction) and on the side downstream from the drum 32. How the guide members 36 and 37 are constructed and work will be described later together with the conveyance of the photosensitive material A.

How the conveyance of the photosensitive material A and the scanning exposing operation are carried out will be described hereinbelow.

Figure 5:
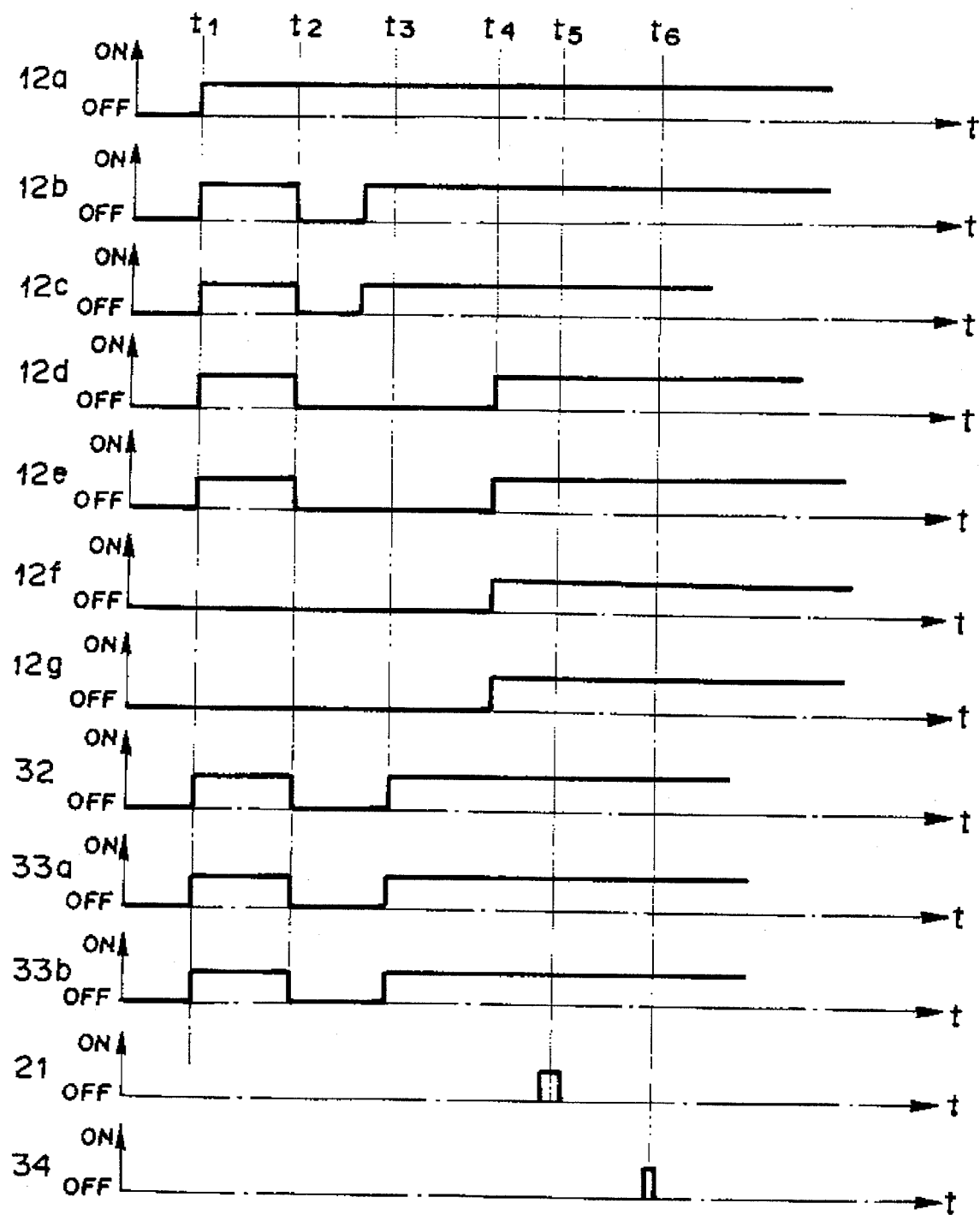
FIG. 5 is a time chart showing how a photosensitive material is conveyed, how a mark is formed in the photosensitive material, and how the photosensitive material is exposed to light.

When the scanning exposing operation is to be carried out, as indicated at a time t1 in FIG. 5, the nip rollers 12a through 12g, the drum 32, and the rollers 33a and 33b are rotated such that the photosensitive material A can be conveyed. Thereafter, the leading end of the photosensitive material A is pulled out of the magazine 7 and nipped by the nip rollers 12a. The long strip of the photosensitive material A is pulled out by the nip rollers 12a, and the direction of conveyance of the photosensitive material A is changed by the guide member 13. The photosensitive material A is then nipped by the nip rollers 12b and is thereafter conveyed linearly as indicated by the arrow X in FIGS. 2 and 4.

The leading end of the photosensitive material A is then detected by a sensor 15, which is located on the side downstream from the nip rollers 12d. At this time, as indicated at a time t2 in FIG. 5, rotations of the nip rollers 12b, 12c, 12d, and 12e and the drum 32 are ceased. At the same time, as indicated by the chained line in FIG. 2, the guide member 13 is opened. However, the nip rollers 12a continue to rotate. Therefore, the photosensitive material A is continuously pulled out of the magazine 7. As a result, a loop indicated by the chained line is formed at the direction change section until a loop sensor is turned on.

When a loop having a predetermined size is formed at the direction change section, a movable member 36a is opened, and the nip rollers 12b and 12c are rotated. As a result, a loop indicated by Y1 is formed on the side upstream from the drum 32.

The size of the loop Y1 is proportional to the length of the photosensitive material A conveyed to the position for the formation of the loop Y1. The length of the photosensitive material A conveyed by the nip rollers 12a, 12b, and 12c can be set by the number of revolutions or the rotation time of the nip rollers 12a, 12b, and 2c. At a time t3 at which the size of the loop Y1 becomes equal to the predetermined size, the drum 32 and the rollers 33a and 33b are rotated, and the photosensitive material A is thereby conveyed to the side downstream from the drum 32. At this time, the nip rollers 12d are not rotated. Therefore, a loop Y2 is formed on the side downstream from the drum 32. The sizes of the loop Y1 and the loop Y2 may be different from each other as shown in FIG. 2 or may be identical with each other as shown in FIG. 4.

How the guide members 36 and 37 and the nip rollers 12c and 12d operate will be described hereinbelow. Instead of conveying the photosensitive material A along a straight line, the pair of nip rollers 12c and the pair of nip rollers 12d are respectively inclined at an angle θ such that the photosensitive material A may be bent toward the positions for loop formation.

The guide member 36 comprises the movable member 36a and a fixed member 36b, which stand facing each other and are spaced from each other such that the photosensitive material A can pass therebetween. Also, the guide member 37 comprises a movable member 37a and a fixed member 37b, which stand facing each other and are spaced from each other such that the photosensitive material A can pass therebetween. When the photosensitive material A is to be conveyed along a straight line, i.e. before the time t2, the movable members 36a and 37a are respectively located at the positions facing the fixed members 36b and 37b as indicated by the chained lines in FIG. 4. When the loops Y1 and Y2 are to be formed, the movable members 36a and 37a are opened by drive mechanisms (not shown) to the positions indicated by the solid lines. Therefore, when the photosensitive material A is to be conveyed along a straight line, regardless of the inclination of the nip rollers 12c by the angle θ, the photosensitive material A can be guided by the guide member 36 such that the photosensitive material A may be reliably sandwiched between the drum 32 and the roller 33a. When the photosensitive material A is to be conveyed along a straight line, the nip pressures of the nip rollers 33a and 33b are released, and at the same time width regulating guides 38 are opened. After the loops Y1 and Y2 are formed, the position of the photosensitive material A is adjusted by the width regulating guides 38, and the photosensitive material A is nipped at an appropriate position between the drum 32 and the nip rollers 33a, 33b.

The photosensitive material A, which has been conveyed to the side downstream from the drum 32 and the roller 33b, is guided by the closed guide member 37 and conveyed so as to be reliably nipped by the nip rollers 12d. Since the pair of the nip rollers 12c and the pair of the nip rollers 12d are respectively inclined at the angle θ, when the movable members 36a and 37a are opened, the loops of the photosensitive material A can be formed easily. After the loops Y1 and Y2 have been formed, the nip rollers 12d, 12e, 12f, and 12g are rotated as indicated at a time t4 in FIG. 5. As a result, the photosensitive material A is conveyed to the side downstream from the nip rollers 12d. However, the nip rollers 12a through 12g are rotated at an equal speed, and therefore the loops Y1 and Y2 do not disappear.

After the loops Y1 and Y2 have been formed, the hole punching device 21 is driven at a time t5, and a mark 22 as shown in FIG. 3 is formed in the photosensitive material A. The mark 22 is formed with a punching process. The formation of the mark 22 is carried out while the photosensitive material A is being conveyed. At a time t6, when the mark 22, which has been formed first, comes to the exposing section 31, the mark 22 is detected by the sensor 34. Also, when a predetermined time has elapsed after the time t6, i.e. at a time t7, the scanning exposing operation is carried out as shown in FIG. 3.

The exposure time is set in accordance with the image information, which has been entered into the photosensitive material processing apparatus. The photosensitive material A is conveyed to the downstream side while the scanning exposing operation is being carried out.

The initial conveyance of the photosensitive material A, the formation of the first mark 22, and the first scanning exposing operation are carried out in the manner described above. The scanning exposing operations are carried out at predetermined intervals in accordance with pieces of image information, which have been entered into the photosensitive material processing apparatus. Therefore, before the first scanning exposing operation is carried out, or when the scanning exposing operation is being carried out, the formation of the next mark 22 is carried out. With this embodiment, the formation of the mark 22 can be carried out such that the conveyance of the photosensitive material A in the exposing section 31 may not be ceased and such that the scanning exposing operation may not be affected adversely.

Specifically, in cases where the hole punching device 21 is driven without the conveyance of the photosensitive material A being ceased at the position for mark formation, the photosensitive material A is stopped forcibly for a very short time while the punch of the hole punching device 21 is perforating through the photosensitive material A. Such a temporary stop of the photosensitive material A constitutes a disturbance for the conveyance of the photosensitive material A. If the exposing section 31 is adversely affected by such a disturbance, nonuniformity will occur in the scanning exposing operation. However, since the loop Y1 has been formed, the portion of the photosensitive material A constituting the loop Y1 is conveyed into the exposing section 31. Therefore, the disturbance does not directly affect the exposing section 31. Accordingly, even if the formation of the mark 22 is being carried out, the scanning exposing operation can be continued in the exposing section 31 such that it may not be adversely affected by the disturbance.

Alternatively, the conveyance of the photosensitive material A in the exposing section 31 may be continued, and the conveyance of the photosensitive material A at the position for mark formation by the hole punching device 21 may be ceased temporarily. In such cases, a disturbance is generated artificially. However, the time during which the conveyance is ceased is very short, and adverse effects on the exposing section 31 can be prevented by the effects of the loop Y1.

The sensor 34 detects the presence or absence of the hole mark 22 by irradiating light to the photosensitive material A and detecting the light having been reflected by the photosensitive material A. For this purpose, light having wavelengths, to which the photosensitive material A is not sensitive, is utilized. Therefore, even if the light produced by the sensor 34 is irradiated to the photosensitive material A, which is being conveyed, the photosensitive material A is not excited by the light.

In the manner described above, the scanning exposing operation, which follows the formation of the first mark 22, and the formation of the next mark 22 are carried out continuously. Therefore, the photosensitive material A is conveyed from the nip rollers 12d to the nip rollers 12e, the guide member 14, the reservoir section 61, and the nip rollers 12f and 12g.

Thereafter, the photosensitive material A is conveyed from the nip rollers 12g to the next process, i.e. the development processing section 4. The structure and the operation of the development processing section 4 will be described hereinbelow with reference to FIG. 1, and the reservoir section 61 located in association with the development processing section 4 will thereafter be described. The development processing section 4 comprises a developing tank 41, a bleaching tank 42, a fixing tank 43, and three washing tanks 44. The drying section 5 is located on the side downstream from the washing tanks 44. Guide members, and the like, are located between the exposure processing section 3 and the development processing section 4, in the spaces inside of the respective tanks, and between the tanks. As an aid in facilitating the explanation, the guide members are not shown, and only nip rollers 45a and 45b and guide rollers 46 are shown in FIG. 1.

The photosensitive material A, which has been exposed to light in the exposure processing section 3 in the manner described above, is conveyed from the nip rollers 45a into the developing tank 41 and dipped in a developing solution. The photosensitive material A is then conveyed by the guide roller 46 into the bleaching tank 42 and dipped in a bleaching solution. Thereafter, the photosensitive material A is conveyed via the guide roller 46 into the fixing tank 43 and subjected to a fixing process.

Thereafter, the photosensitive material A is conveyed via the guide rollers 46 into the washing tanks 44. The photosensitive material A, which has been washed, is conveyed into the drying section 5. In the drying section 5, hot air is blown to the photosensitive material A while it is being conveyed. The photosensitive material A, which has thus been dried, is conveyed by the nip rollers 45b to the cutter 6, cut into sheets having a predetermined size, and discharged from the processing apparatus 1.

In the manner described above, a series of processes, including the scanning exposing operation, the development processing, and the operation for cutting into sheets, are carried out on the photosensitive material A. After a series of processes have been carried out with respect to, for example, 12-frame film or 24-frame film, it is necessary for exposure information with respect to the next film to be entered, and therefore a preparatory period is required. While the preparations are being made, the operation of the exposure processing section 3 is ceased, but the operation of the development processing section 4 should preferably be continued.

Therefore, in this embodiment, the reservoir section 61 is provided such that entry of the information concerning the next film, or the like, can be carried out while the development processing is being carried out. The reservoir section 61 is provided with a swingable guide member 62 and a support section 63 which forms and supports a loop Y3 of the photosensitive material A. When the leading end of the photosensitive material A comes to the reservoir section 61, the swingable guide member 62 is set at a position Pa shown in FIG. 2, and a bridge is thereby formed between the side downstream from the guide member 14 and the nip rollers 12f.

As a result, after the photosensitive material A has passed along the guide member 14, the photosensitive material A is conveyed along the swingable guide member 62, and the leading end of the photosensitive material A is nipped by the nip rollers 12f. Thereafter, the rotation of the nip rollers 12f is ceased temporarily, and the swingable guide member 62 is swung to a position Pb. Therefore, the photosensitive material A enters into the support section 63, and the loop Y3 shown in FIG. 2 is formed in the support section 63.

The size of the loop Y3 is determined by the length of the photosensitive material A conveyed. The length of the photosensitive material A conveyed can be set by the number of revolutions or the rotation time of the nip rollers 12e and other nip rollers. When the nip rollers 12f are rotated after a predetermined length of the photosensitive material A has been conveyed, the photosensitive material A is conveyed into the development processing section 4 while the loop Y3 is being kept. In the development processing section 4, the development processing is carried out on the photosensitive material A.

After the scanning exposing operation has been carried out with respect to, for example, 12-frame film, i.e. after the scanning exposing operation has been carried out in accordance with a single unit of image information, the scanning exposing operation is carried out in accordance with the image information concerning the next film. At this time, a slight length of time is required to make necessary preparations. However, since the reservoir section 61 is provided, the portion of the photosensitive material A, on which the scanning exposing operation has been carried out in accordance with the image information concerning the previous film, is kept as the loop Y3 in the support section 63. Therefore, the portion of the photosensitive material A constituting the loop Y3 is continuously conveyed into the development processing section 4. Accordingly, even if the operation of the exposure processing section 3 is temporarily ceased while the image information concerning the next film is being entered into the photosensitive material processing apparatus, the operation of the development processing section 4 need not be ceased. The photosensitive material A can thus be conveyed at a constant speed into the development processing section 4, and the development processing can be carried out reliably.

No limitation is imposed on how the loop Y3 is formed. For example, the loop Y3 may be formed in the manner described below. For example, the speed with which the photosensitive material A is conveyed by the nip rollers 12a, 12b, 12c, 12d, and 12e, i.e. the speed of conveyance on the side upstream from the reservoir section 61, is set to be higher than the speed of conveyance of the nip rollers 12f and 12g, i.e. the speed of conveyance on the side downstream from the reservoir section 61. In such cases, when the series of processes from the scanning exposing operation to the development processing are carried out continuously, the loop corresponding to the difference in the speed of conveyance between the sides upstream and downstream from the reservoir section 61 is formed in the support section 63. However, with such a method, in cases where the number of frames to be processed is small as in 12-frame film, the size of the loop Y3 becomes small. In cases where the number of frames to be processed is large as in 36-frame film, the size of the loop Y3 becomes large. Therefore, the difference in the speed of conveyance should be set by considering the time required to enter the exposure information, or the like.

As described above, with this embodiment, even if the photosensitive material A taking on the form of a long strip is conveyed in this form, the scanning exposing operation is not adversely affected by the disturbance due to conveyance of the long strip of the photosensitive material, and the scanning exposing operation and the development processing can be carried out accurately. Also, as illustrated in FIG. 3, the spacing between the latent images formed by the exposure, i.e. the spacing between the frames, can be reduced to, for example, approximately 3 mm. With this feature and the continuous processing, the processing capacity can be kept markedly large.

A second embodiment of the photosensitive material processing apparatus in accordance with the present invention will be described hereinbelow with reference to FIGS. 6A through 6F and FIGS. 7A through 7F.

The scanning exposing operation may be carried out continuously or intermittently. How an operation is carried out on the photosensitive material A when the scanning exposing operation is carried out continuously will be described hereinbelow with reference to FIGS. 6A through 6F. Also, how an operation is carried out on the photosensitive material A when the scanning exposing operation is carried out intermittently will be described hereinbelow with reference to FIGS. 7A through 7F.

Figure 6A:
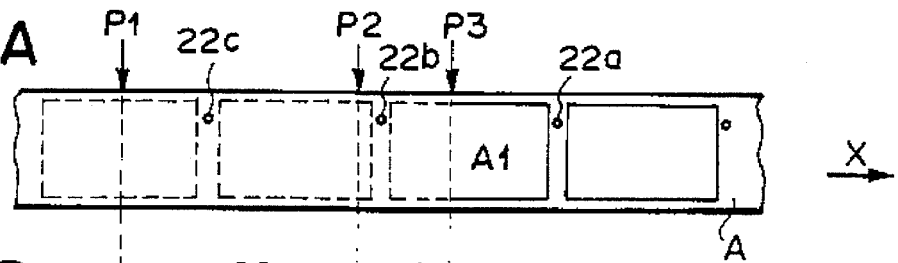
FIGS. 6A through 6F are explanatory views showing how continuous exposure of a photosensitive material to light is carried out in a second embodiment of the photosensitive material processing apparatus in accordance with the present invention.
Figure 6B:
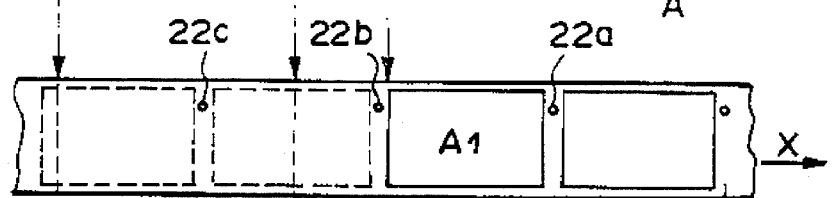

In FIGS. 6A through 6F, the arrow X represents the direction, along which the photosensitive material A is conveyed, P1 represents the position of the hole punching device 21 with respect to the photosensitive material A, and P2 represents the position, at which the sensor 34 detects the mark 22. As an aid in facilitating the explanation, the respective marks 22 are represented by 22a, 22b, . . . Also, the latent images, which have been formed by the scanning exposing operation, are represented by A1, A2, . . . As illustrated in FIG. 6A, while the latent image A1 is being formed by the scanning exposing operation, the mark 22a is detected at the position P2. At this time, counting of the number of pulses is begun by a counter (not shown). Also, as shown in FIG. 6B, while the photosensitive material A is being conveyed in the direction indicated by the arrow X, the scanning exposing operation for a single frame is carried out, and the latent image A1 is thereby formed.

Figure 6C:
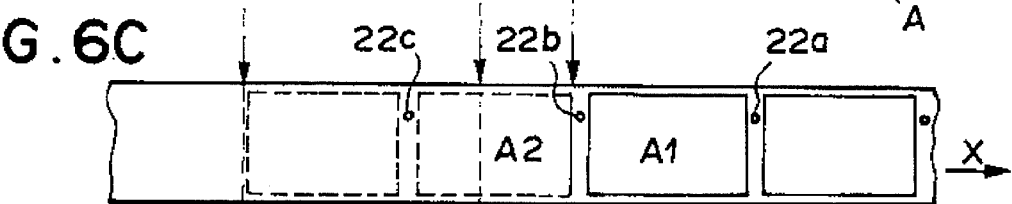
Figure 6D:
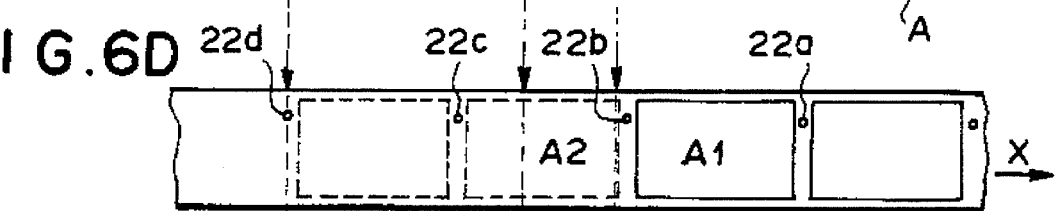
Figure 6E:
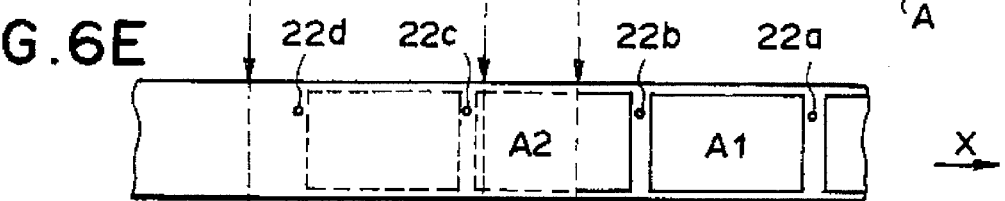
Figure 6F:
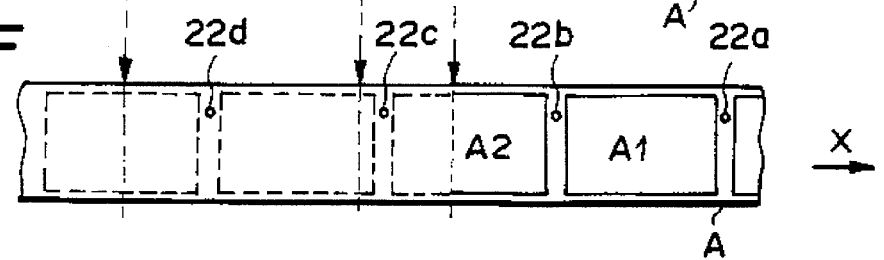

In accordance with the pulse count, the photosensitive material A is conveyed by a predetermined length, e.g. 3 mm, from the position of the latent image A1. Thereafter, as illustrated in FIG. 6C, the scanning exposing operation for the next latent image A2 is begun. The scanning exposing operation is carried out while the photosensitive material A is being conveyed. As illustrated in FIG. 6D, when the photosensitive material A has been conveyed by a predetermined length, even if the scanning exposing operation is being carried out, the hole punching device 21 is operated to form the mark 22d. As illustrated in FIG. 6E, after the mark 22d has been formed, the scanning exposing operation is continued. The next mark 22c is detected while the latent image A2 is being formed as shown in FIG. 6E. From the comparison of FIGS. 6A and 6F, it will be understood that the latent image being formed changes from A1 to A2, and the mark detected changes from 22b to 22c. Specifically, as the photosensitive material A is conveyed, the scanning exposing operation from the state shown in FIG. 6A to the state shown in FIG. 6F is repeated.

How the scanning exposing operation is carried out intermittently will be described hereinbelow with reference to FIGS. 7A through 7F. For example, the intermittent scanning exposing operation is carried out when the scanning exposing operation according to a single unit of image information is finished and the next unit of image information is to be entered into the photosensitive material processing apparatus.

The photosensitive material A is conveyed in the direction indicated by the arrow X. The scanning exposing operation is carried out at the position P3, and the latent image A1 is thereby formed. At this stage, it is found that a unit of image information, which is to be used after the formation of the latent image next to the latent image A1, has not yet been entered into the photosensitive material processing apparatus. As illustrated in FIG. 7B, when the scanning exposing operation for forming the latent image A1 is finished, the conveyance of the photosensitive material A is ceased.

Thereafter, as illustrated in FIG. 7C, the photosensitive material A is conveyed reversely. The reverse conveyance is carried out such that the mark 22b next to the latent image A1 may go back beyond the position P2, at which the sensor 34 is located. The photosensitive material A is then stopped and waits. As illustrated in FIG. 7D, while the photosensitive material A is waiting, a unit of image information, which is to be used after the formation of the latent image next to the latent image A1, i.e. the unit of image information corresponding to a latent image A3 and those which follow, is entered into the photosensitive material processing apparatus.

Thereafter, the photosensitive material A is conveyed. At this time, the latent image A1 is located at the position P3 for exposure, and therefore no scanning exposing operation is started. As illustrated in FIG. 7E, when the photosensitive material A is conveyed in this state, the mark 22b again passes through the position P2. At this time, the number of pulses is counted. The photosensitive material A is conveyed in accordance with the pulse count, which was obtained previously. When the photosensitive material A is thus further conveyed from the position shown in FIG. 7E and the leading end of the area of the formation of the latent image A2 comes to the position P3, the scanning exposing operation for forming the latent image A2 is begun. Also, at the position P1, the mark 22d is formed.

At this stage, the same operation as that in continuous scanning exposing operation is carried out. In this manner, as illustrated in FIG. 7F, the scanning exposing operation for forming the latent image A2 is carried out, and the next mark is formed when the formation of the latent image A3 is begun.

Figure 8:
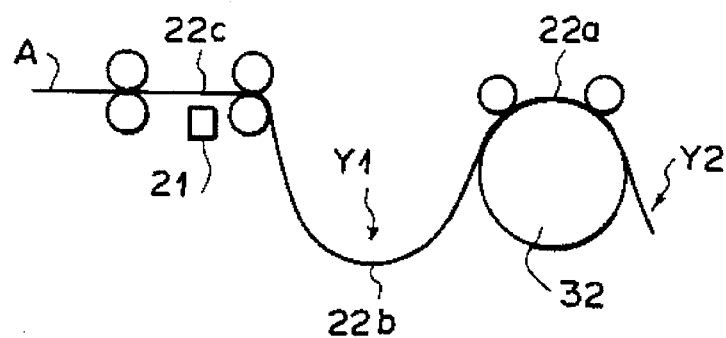
FIG. 8 is an explanatory view showing how a mark is formed in a photosensitive material in a third embodiment of the photosensitive material processing apparatus in accordance with the present invention.

A third embodiment of the photosensitive material processing apparatus in accordance with the present invention will be described hereinbelow with reference to FIG. 8. In the explanation of this embodiment, the same reference numerals as those described above will be used.

This embodiment is related to a feature with respect to the position for the formation of the marks 22. Specifically, when the marks 22a, 22b, 22c, . . . are formed in the photosensitive material A, the spacing between adjacent marks 22 is set at the minimum specification length. For example, in cases where the length, which is taken along the sub-scanning direction and is required for the formation of a latent image, is 82 mm, the length required for the formation of the mark 22 is added to 82 mm. The marks 22a, 22b, . . . are formed at intervals which are equal to the sum of 82 mm and the length required for the formation of the mark 22. The setting of such a spacing can be carried out by controlling such that, when the first mark 22a is located at the position of the sensor 34 as shown in FIG. 8, the portion, at which the third mark 22c is to be formed, may wait at the position at which the hole punching device 21 is located. In the example of FIG. 8, the mark 22b is formed at the position of the minimum specification length from the previous mark 22a, and the hole punching device 21 waits at the position of the minimum specification length from the mark 22b.

When the image information corresponding to the minimum specification length is fed as the next image information into the memory circuit while the hole punching device 21 is in the waiting state, the hole punching device 21 is operated immediately. The spacing between the mark thus formed and the previously formed mark becomes equal to the minimum specification length. In cases where the image information corresponding to the area longer than the minimum specification length, e.g. panoramic image information, is fed as the next image information into the memory circuit while the hole punching device 21 is in the waiting state, the hole punching device 21 is not operated immediately. In such cases, the hole punching device 21 is operated after the photosensitive material A has been conveyed by a predetermined length, and a mark is formed at a spacing, which is equal to the length of the panoramic size, from the preceding mark.

In cases where the marks are formed in the manner described above, the image information for two frames is required for the scanning exposing operation. Specifically, the image information required to carry out the scanning exposing operation on the area between the marks 22a and 22b is stored in a first memory circuit. Also, the image information required to carry out the scanning exposing operation on the area between the marks 22b and 22c is stored in a second memory circuit. After the image information is read from the first memory circuit and the scanning exposing operation is carried to out by conveying the photosensitive material A, the next image information can be stored in the first memory circuit.

While the scanning exposing operation is being carried out on the area between the marks 22b and 22c in accordance with the image information having been read from the second memory circuit, the next image information may be stored in the first memory circuit. In such cases, the scanning exposing operation for the frames, which follow the mark 22c, can be carried out in accordance with the image information stored in the first memory circuit. Specifically, scanning exposing operations can be carried out by using two memory circuit and alternately carrying out storage and reading of image information.

Therefore, the number of the memory circuits required to store image information can be kept small, and the processing apparatus 1 can thus be kept simple.

A fourth embodiment of the photosensitive material processing apparatus in accordance with the present invention will be described hereinbelow with reference to FIGS. 9 through 12.

Figure 9:
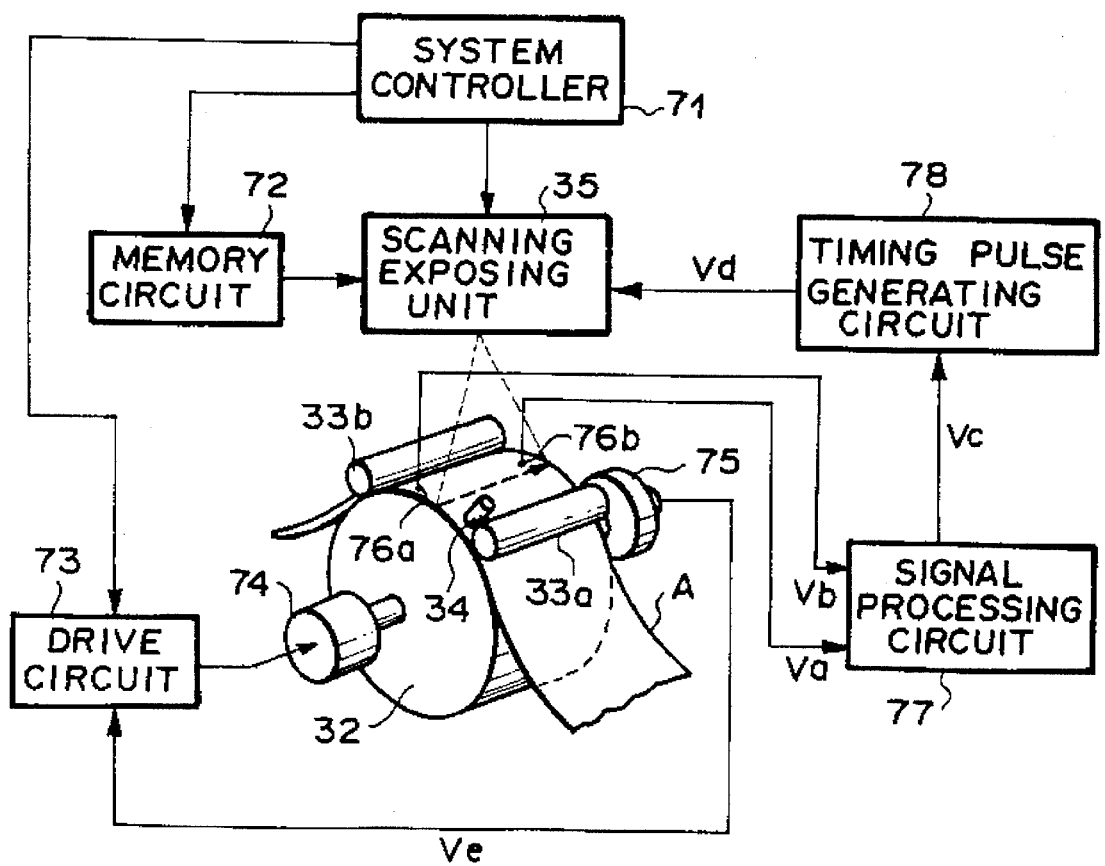
FIG. 9 is a block diagram showing a control system in a fourth embodiment of the photosensitive material processing apparatus in accordance with the present invention.

A system controller (hereinafter simply referred to as the controller) 71 controls the processing apparatus 1 including the aforesaid conveyance mechanism. FIG. 9 primarily shows circuits for carrying out the scanning exposing operation in a manner adapted to meandering of the photosensitive material A. A memory circuit 72 stores image information. The controller 71 controls the storage and reading of image information and entry of the image information into a scanning exposing unit 35. A drive circuit 73 is controlled by the controller 71 so as to drive and stop a motor 74. The drive circuit 73 also receives an output signal Ve from an encoder 75 and controls the motor 74 so as to rotate at an equal speed. In this embodiment, a drum 32 is directly driven by the motor 74.

Sensors 76a and 76b detect the meandering of the photosensitive material A. A detection signal Va or Vb or the difference signal Va-Vb is fed into a signal processing circuit 77. In cases where the meandering occurs with the photosensitive material A, the signal processing circuit 77 generates a control signal Vc corresponding to the amount of meandering. The control signal Vc is fed into a timing signal generating circuit 78. The timing signal generating circuit 78 generates a timing signal Vd for controlling the timing, with which the scanning with the laser beam is started. The timing signal Vd is fed into the scanning exposing unit 35.

How the circuits operate in accordance with the meandering of the photosensitive material A will be described hereinbelow. In cases where the photosensitive material A is conveyed without meandering as indicated by the solid line in FIG. 10A, the output signal Va, Vb, or Va-Vb obtained from the sensors 76a and 76b is equal to, for example, 0 V. In cases where the photosensitive material A meanders as indicated by the chained line in FIG. 10A, the polarity of the output signal Va, Vb, or Va-Vb changes in accordance with the direction of the meandering as shown at T2 and T3 in FIG. 10B. Also, the voltage level of the output signal Va, Vb, or Va-Vb changes in accordance with the amount of the meandering. Specifically, the output signal Va, Vb, or Va-Vb represents the occurrence of the meandering, the amount of the meandering, and the direction of the meandering. The signal processing circuit 77 feeds the control signal Vc, which corresponds to the output signal Va, Vb, or Va-Vb, to the timing signal generating circuit 78.

Figure 10A:
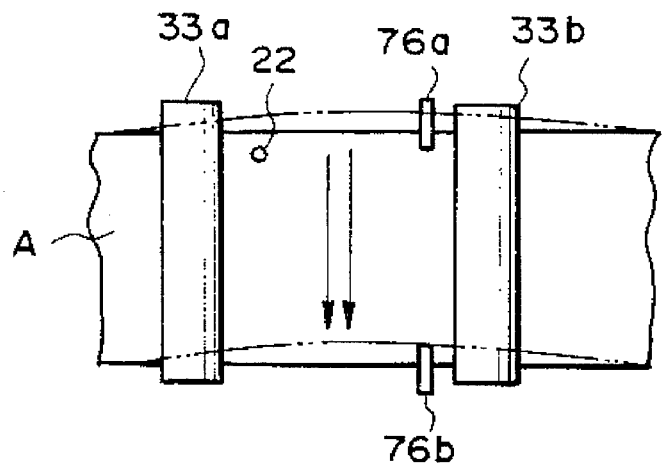
FIGS. 10A, 10B, and 10C are explanatory diagrams showing how meandering of a photosensitive material is detected and how the position at which the exposure along each scanning line is started is controlled.
Figure 10B:
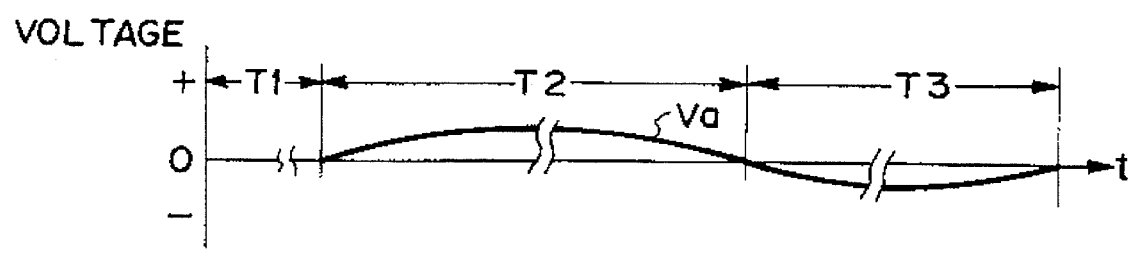
Figure 10C:
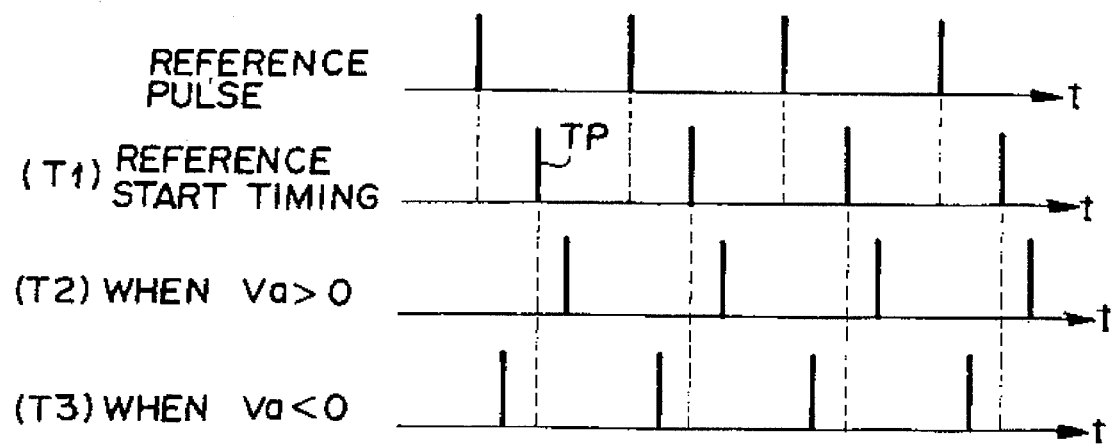

In cases where the photosensitive material A is conveyed normally, the timing signal generating circuit 78 generates timing pulses TP with the reference start timing as indicated by T1 in FIG. 10C. The differences between the timing pulses TP and the reference pulses are constant. When the meandering occurs with the photosensitive material A, as indicated by T2 in FIG. 10C, the timing, with which the timing pulses TP are generated, is delayed with respect to the reference start timing in accordance with the direction of the meandering and the amount of the meandering. Alternatively, as indicated by T3 in FIG. 10C, the timing, with which the timing pulses TP are generated, is advanced with respect to the reference start timing in accordance with the direction of the meandering and the amount of the meandering. As a result, the position, at which the irradiation of the laser beam to the photosensitive material A is started, i.e. the position, at which the exposure along each scanning line is started, is controlled in accordance with the timing pulses TP.

Figure 11A:
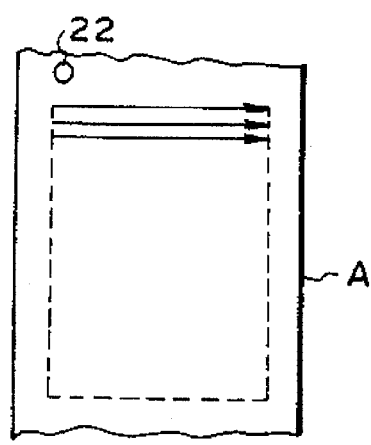
FIGS. 11A, 11B, and 11C are explanatory views showing the position at which the exposure along each scanning line is started.

Specifically, the position, at which the exposure along each scanning line is started, is controlled in the manner described below. As indicated by T1 in FIG. 10C, in cases where no meandering occurs with the photosensitive material A, the timing pulses TP coincide with the reference start timing. Therefore, as illustrated in FIG. 11A, the exposure along each scanning line is started at an identical position.

Figure 11B:
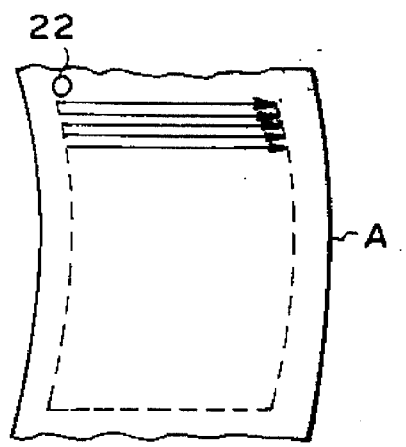

As indicated by T2 in FIG. 10C, in cases where the photosensitive material A meanders toward the right, the delay of the timing pulses TP with respect to the reference start timing becomes large. Therefore, as illustrated in FIG. 11B, the timing, with which the exposure along the next scanning line is started after the exposure along a single scanning line is finished, is delayed. However, the delay time of the timing pulses TP with respect to the reference start timing is proportional to the amount of the meandering of the photosensitive material A. Therefore, the exposure along each scanning line is started at the identical position with reference to the edge on one side of the photosensitive material A.

Figure 11C:
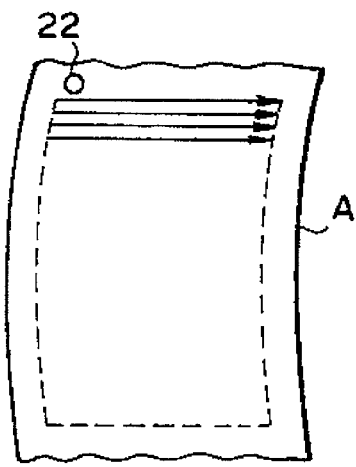

Also, as indicated by T3 in FIG. 10C, in cases where the photosensitive material A meanders toward the left, the delay time of the timing pulses TP with respect to the reference start timing reduces. Therefore, as illustrated in FIG. 11C, the timing, with which the exposure along the next scanning line is started after the exposure along a single scanning line is finished, is advanced. However, the time width between the timing pulses TP is proportional to the amount of the meandering of the photosensitive material A. Therefore, the exposure along each scanning line is started at the identical position with reference to the edge on one side of the photosensitive material A.

In the manner described above, in cases where the meandering occurs with the photosensitive material A, the position, at which the exposure along each scanning line is started, is controlled in accordance with the direction of the meandering and the amount of the meandering. Therefore, after the exposure is finished, the exposed area on the photosensitive material A becomes the same as that shown in FIG. 11A. Accordingly, even if the meandering occurs with the photosensitive material A, the exposure can be carried out accurately.

Figure 12:
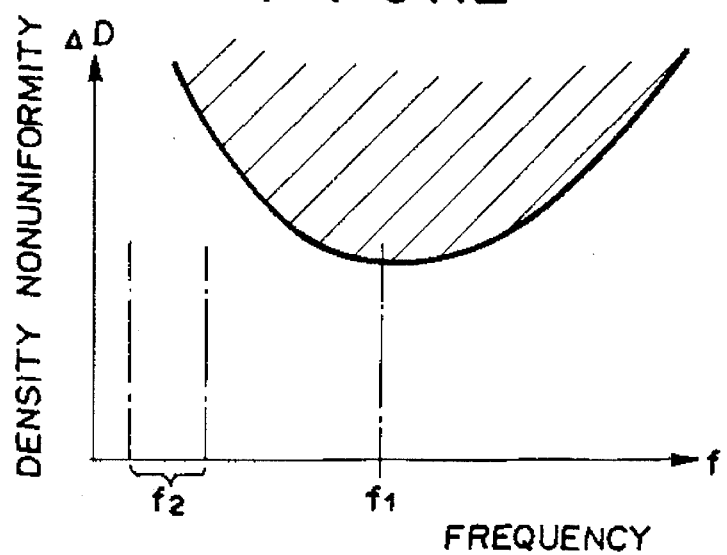
FIG. 12 is a graph showing the relationship between the vibration frequency and the density.

Reverting to FIG. 9, the drum 32 is directly driven by the motor 74 for the reasons described below. Specifically, the drum 32, a support mechanism (not shown), the conveyance mechanism utilizing gears and belts, and the like, have natural oscillations. As illustrated in FIG. 12, the density nonuniformity perceptibility characteristics with respect to the oscillation frequency f of the system comprising the drum 32, the belts, and the like, have heretofore been known as being such that the density nonuniformity perceptibility is highest with respect to a certain frequency f1. Also, in cases where the drum 32 is driven with belts, or the speed of the drum 32 is reduced by a reduction gear, the oscillation frequency of the drum 32 becomes close to the frequency f1, and it becomes difficult to avoid the region, in which the density nonuniformity perceptibility is high. In FIG. 12, the hatching indicates the region in which the density nonuniformity is perceptible.

Therefore, in this embodiment, the drum 32 is directly driven by the motor 74 having an optimum number of poles such that the oscillation frequency f of the drum 32 may shift from the value, which is close to f1, to a value close to, for example, f2. As a result, the oscillation frequency of the drum 32 shifts from the value, which is close to f1, to a lower frequency, and the scanning exposing operation can thus be carried out accurately. In general, f1=10 Hz to 50 Hz, and f2=0.1 Hz to 1 Hz.

Figure 13:
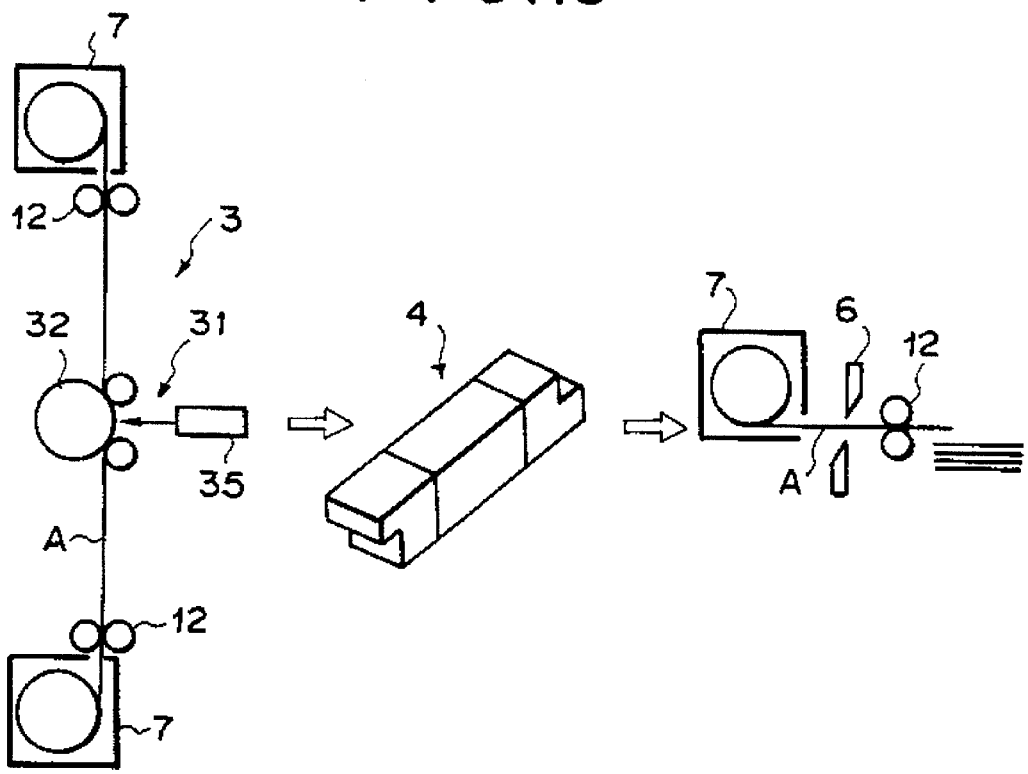
FIG. 13 is a schematic view showing a modification of the photosensitive material processing apparatus in accordance with the present invention.

The photosensitive material processing apparatus in accordance with the present invention is applicable to miniature development laboratories, in which the exposure processing section 3 and the development processing section 4 are combined together, and large-sized photosensitive material processing apparatuses. For example, FIG. 13 shows a modification of the photosensitive material processing apparatus in accordance with the present invention, wherein the exposure processing section 3, the development processing section 4, and the cutter 6 are separated from one another. The photosensitive material A, which has been exposed to light in the exposure processing section 3, is again housed in the magazine 7 and manually loaded to the development processing section 4. The photosensitive material A, which has been subjected to the development processing, is housed in the magazine and manually loaded to the cutter 6. With such a structure, the conveyance mechanism 11, the exposing section 31, and the like, are constituted in the same manner as that in the aforesaid embodiment. However, the reservoir section can be omitted.

Figure 14:
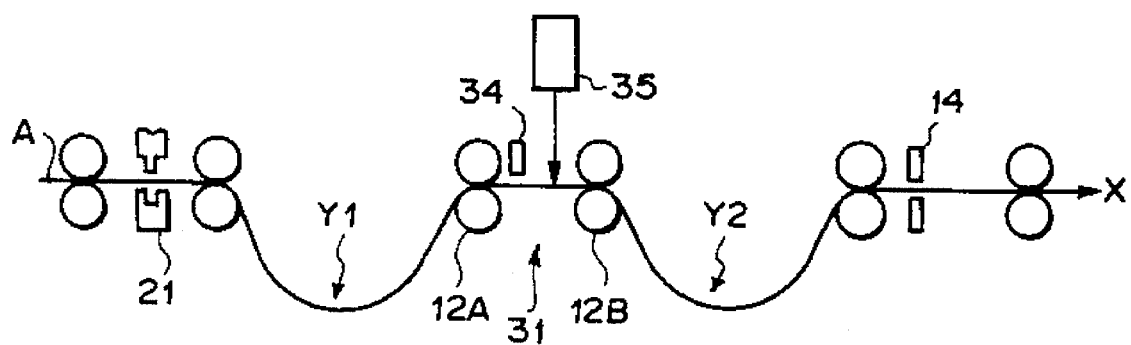
FIG. 14 is a schematic view showing a different modification of the photosensitive material processing apparatus in accordance with the present invention.

In the exposing section 31, the drum 32 need not necessarily be utilized. As illustrated in FIG. 14, the photosensitive material A may be nipped by the pairs of the nip rollers 12A and 12B such that the photosensitive material A may not be slack between the pairs of the nip rollers 12A and 12B. In this manner, the scanning exposing operation may be carried out at the area between the pairs of the nip rollers 12A and 12B. In such cases, the pair of the nip rollers 12B should preferably be directly driven by a motor.

As described above, the mark 22 is not limited to the hole and may be formed by an ink jet printer, or the like. In accordance with the type of the mark 22, the sensor 34 may be changed to a sensor for detecting light, which has passed through the photosensitive material A, a sensor for detecting light, which has been reflected by the photosensitive material A, an infrared sensor, or the like. Also, the mark 22 may be formed at the position of the sensor 34. In such cases, an ink jet printer, or the like, should preferably be utilized as the mark forming means such that no unintentional movement may occur with the photosensitive material A due to the formation of the mark 22.

The exposing section 31 and other members are incorporated in the processing apparatus 1 via anti-vibration means, such as anti-vibration rubber, such that vibration may be reduced.

What is claimed is:

1. A photosensitive material processing apparatus comprising:

a conveyor, which conveys a photosensitive material along a predetermined conveyance path;

an exposure section, which exposes the photosensitive material to light in accordance with image information and forms latent images on the photosensitive material;

a development processing section developing the latent images, wherein the photosensitive material is in the form of a long strip and is fed into the conveyor and conveyed in this form; and a reservoir section forming a looped portion in the long strip of the photosensitive material, on which the latent images have been formed, said looped portion serving as a buffer for conveyance, said development processing section development processing the long strip of the photosensitive material, which is fed via said reservoir section, said exposure section, said reservoir section and said development processing section being located in the conveyance path and, the long strip of the photosensitive material being deviated from a straight conveyance path by said reservoir section once said looped portion is formed independent of relative speeds of conveyance in said exposure section and said development section.

2. A photosensitive material processing apparatus as defined in claim 1 wherein said light is a laser beam.

3. A photosensitive material processing apparatus as defined in claim 1, wherein said reservoir section further comprises a swingable guide member receiving the long strip of the photosensitive material.

4. A photosensitive material processing apparatus as defined in claim 3, further comprising means for setting said swingable guide member in a first position to form a straight path with said conveying path and in a second position to form the looped portion.

5. A photosensitive material exposing apparatus as defined in claim 1, wherein said exposure section exposes the photosensitive material to light while the photosensitive material is being conveyed along the conveyance path.

6. A photosensitive material exposing apparatus comprising:

a conveyor, which conveys a photosensitive material along a predetermined conveyance path;

an exposure section, which exposes the photosensitive material to light in accordance with image information and forms latent images on the photosensitive material, wherein the photosensitive material is in the form of a long strip and is fed into the conveyance means and conveyed in this form, and the exposure section carries out scanning exposing operations on the long strip of the photosensitive material and thereby forms latent images on the long strip of the photosensitive material; and loop forming means for forming a first looped portion in the long strip of the photosensitive material located on the side upstream from the exposure section and for forming a second looped portion in the long strip of the photosensitive material located on the side downstream from the exposure section, said looped portions serving as buffers for conveyance, said exposure section and said loop forming means being located in the conveyance path.

7. A photosensitive material exposing apparatus as defined in claim 6 wherein said light is a laser beam.

8. A photosensitive material exposing apparatus as defined in claim 6, wherein said first looped portion and said second looped portion are adjacent to said exposure section.

9. A photosensitive material exposing apparatus as defined in claim 6, wherein said loop forming means comprises a first movable guide member inclined from a straight line of said predetermined conveyance path upstream from said exposure section and a second movable guide member inclined from a straight line of said predetermined conveyance path downstream from said exposure section.

10. A photosensitive material processing apparatus as defined fin claim 9 further comprising two pairs of rollers, one pair being located in front of said first movable guide member along said predetermined conveyance path and another pair being located after said second movable guide member along said predetermined conveyance path, said rollers within each of said pairs being respectively inclined along said predetermined conveyance path.

11. A photosensitive material exposing apparatus as defined in claim 6, wherein said first looped portion and said second looped portion are the same size.

12. A photosensitive material exposing apparatus as defined in claim 6, wherein said first looped portion and said second looped portion are different sizes.

13. A photosensitive material exposing apparatus as defined in claim 6, wherein said exposure section exposes the photosensitive material to light while the photosensitive material is being conveyed along the conveyance path.

14. A photosensitive material exposing apparatus comprising:

a conveyor, which conveys a photosensitive material along a predetermined conveyance path;

an exposure section, which exposes the photosensitive material to light in accordance with image information and forms latent images on the photosensitive material, wherein the photosensitive material is in the form of a long strip, is fed into the conveyance means and is conveyed in this form;

mark forming means for forming a mark on the long strip of the photosensitive material; and a sensor detecting the presence or absence of a mark, wherein the exposure section carries out a scanning exposing operation on the long strip of the photosensitive material subsequent to the detection of a mark by said sensor and thereafter forms a latent image on the long strip of the photosensitive material, said exposure section, said mark forming means and said sensor being located in the conveyance path.

15. A photosensitive material exposing apparatus as defined in claim 14 wherein said light is a laser beam.

16. A photosensitive material exposing apparatus as defined in claim 14, wherein said mark forming means waits for a minimum specification length position for the formation of a latent image, during the formation of marks.

17. A photosensitive material exposing apparatus as defined in claim 14 wherein said light is a laser beam.

18. A photosensitive material exposing apparatus as defined in claim 16, wherein said mark forming means is upstream of said exposing section in the conveyance path.

19. A photosensitive material exposing apparatus as defined in claim 14, wherein said scanning exposing operation is continuous and said mark forming means forms a mark in the long strip of the photosensitive material when the photosensitive material has been conveyed by a predetermined length.

20. A photosensitive material exposing apparatus as defined in claim 14, wherein said scanning exposing operation is intermittent and said mark forming means forms a mark when the formation of an immediately preceding latent image begins.

21. A photosensitive material exposing apparatus as defined in claim 14, wherein said mark forming means is upstream of said exposing section in the conveyance path.

22. A photosensitive material exposing apparatus as defined in claim 14, wherein said exposure section exposes the photosensitive material to light while the photosensitive material is being conveyed along the conveyance path.

23. The photosensitive material exposing apparatus of claim 14, wherein the mark formed on the long strip of the photosensitive material is a hole punched through the long strip of the photosensitive material.

24. The photosensitive material exposing apparatus of claim 14, wherein the mark formed on the long strip of the photosensitive material is an ink dot.

25. The photosensitive material exposing apparatus of claim 14, wherein the mark forming means forms a next sequential mark a predetermined time after the exposure section forms a latent image subsequent to the forming of a previous mark.

26. The photosensitive material exposing apparatus of claim 14, wherein the exposure section forms a latent image on the long strip of the photosensitive material a predetermined time after the sensor detects the presence of a mark.

27. A photosensitive material exposing apparatus comprising:

a conveyor, which conveys a photosensitive material along a predetermined conveyance path; and an exposure section, which exposes the photosensitive material to light in accordance with image information and forms latent images on the photosensitive material, wherein the photosensitive material is in the form of a long strip and is fed into the conveyor and conveyed in this form, and the exposure section, which carries out scanning exposing operations on the long strip of the photosensitive material in accordance with units of image information and thereby forms latent images on the long strip of the photosensitive material, and the conveyor which, in cases where a next unit of image information to be used after a latent image is formed by the exposure section has not yet been determined, temporarily ceases the conveyance of the long strip of the photosensitive material after the formation of the latent image, reversely conveys the long strip of the photosensitive material by a predetermined amount, and thereafter waits for entry of the next unit of image information, are located in the conveyance path.

28. A photosensitive material exposing apparatus as defined in claim 27 wherein said light is a laser beam.

29. A photosensitive material exposing apparatus comprising:

a conveyor, which conveys a photosensitive material along a predetermined conveyance path;

an exposure section, which exposes the photosensitive material to light in accordance with image information and forms latent images on the photosensitive material, wherein the photosensitive material is in the form of a long strip and is fed into the conveyor and conveyed in this form, the exposure section carries out scanning exposing operations on the long strip of the photosensitive material in accordance with units of image information and thereby forms latent images on the long strip of the photosensitive material;

a plurality of detectors, each of which detects an edge of the long strip of the photosensitive material being conveyed and detects an amount of meandering of an edge of the long strip of the photosensitive material being conveyed, said exposure section and said detector being located in the conveyance path; and a timing signal generator which controls the position, at which the exposure along each scanning line by the exposure section is started, in association with the meandering of the long strip of the photosensitive material based upon a detection signal, generated from amounts of meandering of at least two different edges of the long strip detected by at least two of said plurality of detectors.

30. A photosensitive material exposing apparatus as defined in claim 29 wherein said light is a laser beam.

31. A photosensitive material exposing apparatus comprising:

a conveyor, which conveys a photosensitive material along a predetermined conveyance path;

an exposure section, which exposes the photosensitive material to light in accordance with image information and forms latent images on the photosensitive material; and a development processing section developing the latent images, wherein the photosensitive material is in the form of a long strip and is fed into the conveyor and conveyed in this form, and the exposure section comprises a rotatable body conveying the long strip of the photosensitive material such that the long strip of the photosensitive material may be in close contact with the rotatable body, a motor directly driving said rotatable body, and a scanning exposing unit scanning exposing operations on the long strip of the photosensitive material, and is located in the conveyance path, wherein said motor has a number of poles such that the oscillation frequency of said rotatable body is reduced.

32. A photosensitive material exposing apparatus as defined in claim 31 wherein said light is a laser beam.

33. A method of conveying a long strip of photosensitive material through a photosensitive material processing apparatus comprising the steps of:

conveying the long strip along a predetermined conveyance path;

exposing, during said conveying step, the long strip to light in accordance with image information, thereby forming latent images of the long strip;

forming a permanent, variable length looped portion in the long strip of photosensitive material on which latent images have been formed; and delivering the long strip of the photosensitive material from the looped portion to a development processing section, said permanent, variable length looped portion buffering said conveying of the long strip between said exposing step and said delivering step.

34. A method as defined in claim 33, wherein said forming step further comprises setting the length of the long strip of the photosensitive material in said looped portion to a predetermined length.

35. A method as defined in claim 34, wherein said setting comprises counting an amount of rotation time of rollers delivering the long strip of the photosensitive material to said looped portion.

36. A method as defined in claim 33, wherein said forming step comprises positioning a swingable guide member along a straight path conveying a first end of the long strip of the photosensitive material to a remainder of said predetermined conveyance path and swinging said swingable guide member into a position away from said straight path, thereby forming the permanent, variable length looped portion.

37. A photosensitive material exposing apparatus comprising:

a conveyor which conveys a long strip of a photosensitive material along a predetermined conveyance path;

an exposure section which exposes the long strip to light in accordance with image information and forms latent images on the long strip; and a conveyance buffer including a guide which guides the long strip along a variable length looped portion in said predetermined conveyance path to buffer conveyance of the long strip from variations in conveyance speed along said predetermined conveyance path.

* * * * *